Figure 1:
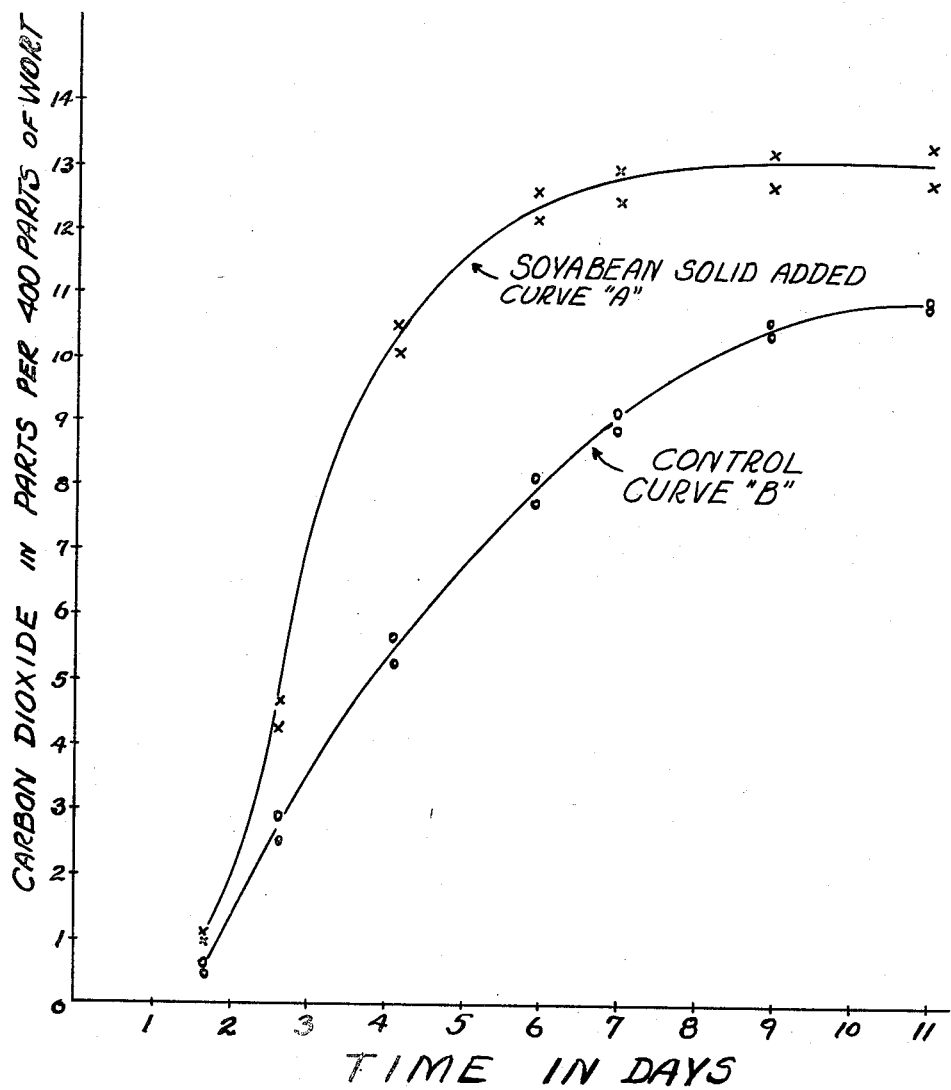

UNITED STATES PATENT OFFICE 2,692,199

METHOD OF MAKING BEER

Ralph O. Weber, St. Paul, Minn., assignor to Archer-Daniels-Midland Company, Minneapolis, Minn., a corporation of Delaware Application February 29, 1952, Serial No. 274,116

4 Claims. (Cl. 99—42)

This invention relates to processes of making beer, and more particularly to improvements wherein there is utilized the solid materials of soybeans from which the oil has been removed.

Beer is a yeast-fermented water extract of malted barley, carbohydrate adjuncts, and hops. In the trade, the term "adjuncts" refers to carbohydrate sources other than barley and may include corn, rice, grain sorghums, and the like carbohydrate sources. The extract from malted barely, adjuncts, and hops is called "wort." Production of wort in the brewery is a complicated enzymatic process designed to produce a maximum yield of the right proportions of fermentable and unfermentable carbohydrates in the wort, in addition to suitable proportions of amino acids and optimum quantities of necessary vitamins. In the normal beer-making procedure the barley malt is first mixed with water, and the proteolytic enzymes present in barley malt are allowed to act further to break down the barley protein. Next, cooked adjuncts such as corn and rice are added to the mash, and a period for enzymatic conversion of starches to sugar follows. After the starch conversion is complete, the extract is separated from the spent solids (barley, adjuncts, etc.) by filtration. The clear extract is then boiled, and hops are added just before the boiling is completed. Then the hops are filtered out, and the hot wort is passed over a cooler which also permits reaeration of the wort. The mashing process, wort boiling, and wort cooling require about 8 hours' time. The characteristics of the finished beer can be greatly modified by variations in the mashing procedures used.

The cold wort is then inoculated with yeast. The fermentation proceeds for around 10 days at a temperature of 10° C., with lower temperatures at the beginning and end of this process. In some breweries higher temperatures up to 18 to 20° C. may be permitted, so as to save time during fermentation or because inadequate refrigeration equipment is available, but this is not considered good practice. Preferred practice limits the primary fermentation to temperatures of 11 or 12° C. at the most, and the time of fermentation is 9 to 11 days. These are the approximate conditions for production of a typical unaged American beer. The time and temperatures used will vary slightly from one brewery to another. Again, it may be said that the nature of the finished beer will be seriously affected by the yeast inoculum and the environmental conditions used.

After this primary fermentation, the immature beer is pumped off from the settled yeast into refrigerated storage tanks. Here maturation of the beer occurs during a slow secondary fermentation of from a few days to several months at temperatures near 0° C. Short aging periods are discouraged. When aging is complete, the beer is treated with enzymes to destroy haze, clarified by filtration, carbonated under pressure, and run into barrels, bottles, or cans. The packaged beer is pasteurized.

An average beer wort may contain 12% by weight of "extract" consisting of fermentable sugars and unfermentable dextrins. During the primary fermentation, some 7% of the "extract" is converted into 3.5% alcohol and the same amount of carbon dioxide which is later lost as a gas and is still later replaced in part. During the aging period, about 0.5% more of the "extract" is fermented to give a final alcohol content of approximately 3.75% and leaving about 4.5% of unfermented extract (real extract) in the beer. A measurement designated "apparent extract" is a determination of the amount of solids (mostly sugar) present in the beer and is a term commonly used by brewers. It is a calculation based on the uncorrected specific gravity of a beer which has not been de-alcoholized. The "apparent extract" on an average American beer would be 3.0%. The "real extract" is an exact determination of the solids (mostly sugar) and is made by accurate methods.

It has heretofore been proposed to use soybean solids in the production of beer. Beginning with the publication of A. S. Wahl entitled "A New Method of Increasing Body in Beer," Brewery Management and Engineering, August (1933), it was proposed to increase the protein content of beer by the use of expeller-type soybean meal in the mash, and the attention of brewers was directed to the use of this adjunct. In 1941, J. W. Hayward, in an article entitled "Soybean Brew Flakes for Brewing—A Promising Adjunct," Western Brewing World, 49, Nos. 5, 7 (1941), reported on the use of solvent-extracted soybean flakes as an addition to the solids in the mash tub, to contribute certain improvements to the brewing process. G. B. Sippel, in an article entitled, "Some Observations on Yeast Degeneration," The American Brewer, 75, Nos. 11, 9 (1942), published a report on the favorable effect which the use of de-fatted soybean solids in the mash had upon the production of beer. Again, A. S. Wahl, in his book entitled "Wahl Handybook, Vol. II, Brewing Materials," 518 (1944), Wahl Institute, Inc., Chicago, Ill., republished his ideas on the use of de-fatted soybean solids for increasing the protein content of beer. The use of de-fatted soybean solids in the mash as a part of the brewing process, was given official recognition by the Master Brewers' Association of America in 1947. They included in their manual for the brewing industry, The Practical Brewer, page 60 (1947), Master Brewers' Association of America, a section on the use of de-fatted soybean solids with malt and adjuncts in the mash tub to stimulate the yeast and increase the attenuation of the brew. By the term "attenuation" as used here, there is meant the using up of the fermentable solid contents of the wort during the fermentation procedure.

It is an object of the present invention to provide improvements in beer making processes and more specially to provide processes wherein the time required for primary beer fermentation at a typical and desirable low temperature (around 10° C.) is reduced by about ⅓ or more.

It is a further object of the invention to provide an improved beer making process wherein more alcohol is formed and less unfermented solids remain in the wort at the end of the primary fermentation process.

It is the further object of the invention to provide a beer making procedure wherein the size of the yeast crop produced during fermentation is increased.

It is another object of the invention to provide an improved beer making process wherein the beer is improved in flavor and a shorter aging period made practical.

It is also an object of the invention to provide an improved beer making process wherein a beer of lighter color is produced. Other and further objects of the invention include those inherent in the processes herein disclosed and claimed.

Figure 2:
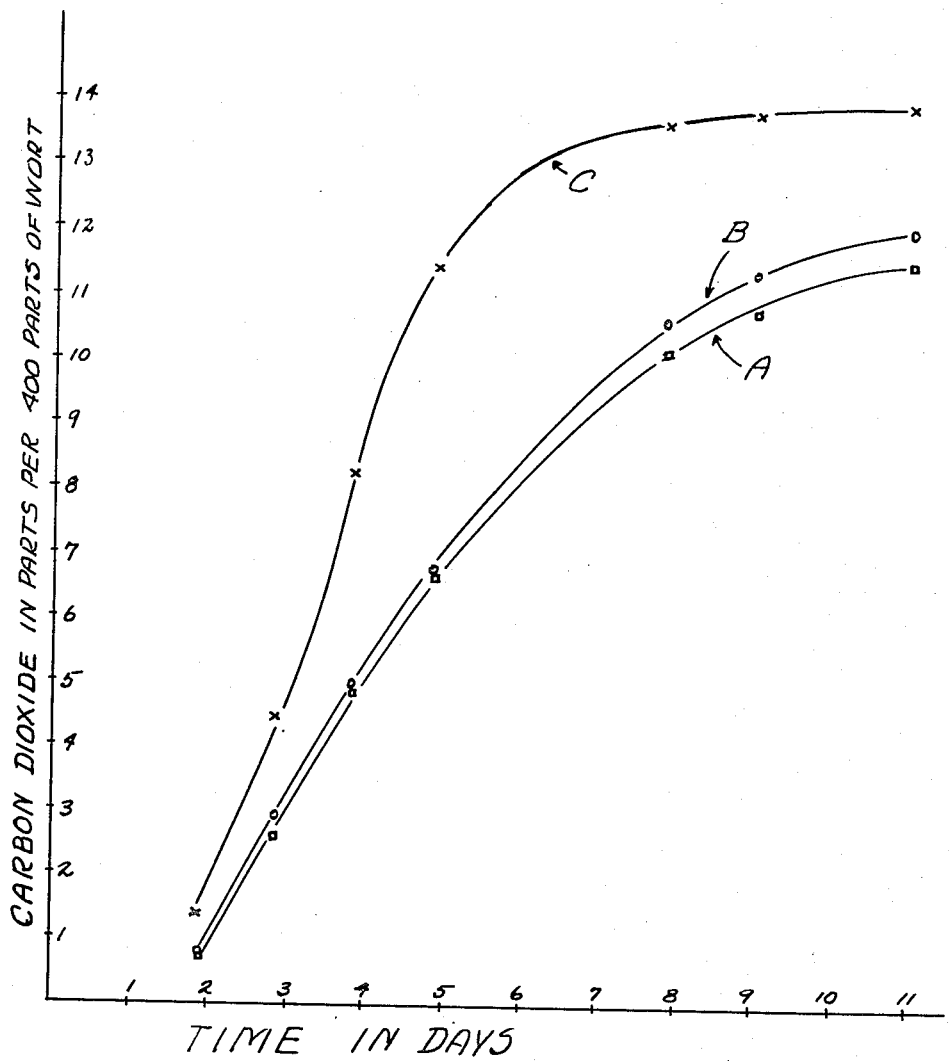

The invention is illustrated with reference to the drawings wherein Figures 1 and 2 are graphs illustrating the rate and extent of fermentation as determined by a measurement of the carbon dioxide released by the fermenting wort, such determinations having been made on a comparative basis utilizing old beer making procedures, and the improved processes of the present invention.

According to my invention, the beer making process utilizes the preparation of a beer wort containing the usual ingredients and produced in the regular manner. No disturbance in the brewers procedure is therefore necessary. According to this usual process of wort preparation, barley malt is placed in a container called a mash tub, and to this there is added water at approximately 40° C. and in an amount according to usual procedures. The relative amounts of barley malt and water and temperatures used are well known to brewers. The water is permitted to stand on the barley malt for approximately ½ hour so as to permit the proteolytic enzymes of the malt to act upon the barley proteins. After this proteolytic conversion there may, according to some procedures, then be added cooked adjuncts, these being added directly to the mash tub and throoughly stirred in with the other ingredients. Such cooked adjuncts may include corn and/or rice, grain sorghum, or other starchy or carbohydrate containing materials in a suitable state of division. Where such adjuncts are added to the mash tub, it is necessary to allow a certain holding time so as to permit the diastatic enzymes of the barley malt to act upon the starchy components of the adjuncts in order to convert them to sugars suitable for fermentation. Accordingly, where adjuncts are used, there is then permitted a sufficient holding period for such diastatic enzymatic reaction to take place. Sugar syrups may be used to replace all or part of the starchy adjuncts.

It is at this point in the usual brewing procedure that the solid materials of the mash tub are filtered out of the liquid components, and the liquid component, which is designated wort, is boiled for about 1 or 2 hours so as to concentrate the wort to some extent, to coagulate unwanted proteins and to produce a sterile material. Just before completion of the boiling period, hops are added so as to get the hop flavor, but not so soon that the hop flavor will be lost through boiling, and then the hot wort is run through a strainer so as to remove the hop residues. The hot wort is then sent over a cooler which reduces its temperature to approximately 7 or 8° C., after which the cooled wort goes to fermenting vats. The brewers' yeast slurry (16.5% yeast solids, dry basis) is then added in an amount usually ranging from .4 to .6% yeast slurry, based upon the weight of the wort, .5% being usual. Some brewers use amounts of yeast outside of these preferred ranges, and the exact amount of yeast is not critical. It may therefore be said that an amount of yeast equivalent to 0.1% to 1.25% of 16.5% yeast solids content liquid brewers' yeast may be used. As used in breweries, the live yeast is in a slurry which contains 16.5% yeast solids and the percentage of "yeast" that is added to the wort is actually the percentage of the yeast slurry.

The usual (brewery) fermentation period is continuous, running for from 9 to 11 days, and according to best practice is begun at a temperature of 7 to 8° C., and after about 18 to 24 hours, the temperature is raised to around 10° C. and held there until approximately the 9th or 10th day of fermentation, after which the batch is slowly cooled to about 2° C. Sometimes higher temperatures of as much as 18 to 20° C. are permitted to be obtained, either to speed fermentation or because of inadequate refrigeration equipment and these temperatures may therefore be considered as within commercial practice, but they are not preferred practice and produce what is considered to be an inferior product. The beer is then pumped off from the settled yeast and is put into tanks for aging at a temperature of approximately 0° C. The aging period may extend from several days to a month or more, a long aging period being preferred, and during this aging period a slight, secondary fermentation, essential to the production of good beer, takes place at the low aging temperatures.

After the aging period, the beer is ready for use, and if it is to be bottled or canned, it is pasteurized. Carbon dioxide is added to the beer for carbonation purposes.

In carrying out my invention, the preparation of the wort in the mash tub can in all respects be the same as above described. The Brewmaster need make no changes in the wort preparation according to the usual beer making process. However, after the beer wort has been prepared, and heated for sterilization, etc., as above described, the beer wort has added thereto soybean solids such as soybean flakes, soybean grits, or even soybean flour from which substantially all of the oil has been removed. Such de-fatted soybean solids, particularly soybean flakes, are an article of commerce and readily available. For my process, I prefer to use light colored soybean flakes such as are known in the trade as "extracted soybean flakes." De-fatted soybean solids other than soybean flakes, such as grits, etc., may be used. Such de-fatted soybean solids, of which the commercial "extracted soybean flakes" are exemplary, are then placed either in water or in a portion of the beer wort, and the resultant mixture is heated to a temperature of approximately boiling at atmospheric pressure and held there for several minutes so as to effect a substantial pasteurization of such de-fatted soybean solids. For this purpose, one part of the soybean solids to about 10 to 30 parts of water or wort is used, the proportions not being critical. Other methods of pasteurization may be used. Where the soybean solids are free from microbiological contamination, such pasteurization may be omitted. The step of pasteurizing of the soybean solids is preferred as a worthwhile precautionary measure. The defatted soybean solids either pasteurized or in an already substantially microbiologically free state, are then added to the beer wort, which has already been pasteurized by heating, as previously described. Such slurry may be added to the beer wort while it is still hot, or it may be added to the beer wort after it has been cooled.

The amount of the aforesaid soybean solids which is added to the beer wort ranges from one part of soybean solids by weight to ten thousand parts by weight of wort. Stated another way, the amount of soybean flakes as described is added to the hot or cold sterilized beer wort, in an amount equal to .01% to .2% by weight, based upon the weight of the wort, the weight of the soybean solids being taken on an air dry basis. The preferred amount of the soybean solids to be added on this basis being 0.05% to 0.15%.

The wort is then inoculated in the usual manner with the customary quantities of brewers' yeast and is permitted to ferment in the usual manner. However, according to my invention, the time of fermentation may be reduced as much as 30% less than the 9 to 11 day fermentation which is normally used as above described. The temperatures of fermentation, however, and the temperatures used during the aging period are in all respects according to the usual beer making procedure as above described.

As a result of the use of my procedure, the alcoholic content of the so produced beer is substantially increased, the "apparent extract" determination as above noted being at the same time substantially reduced. The "real extract," which is an accurate determination of solids in the beer is substantially less in beer made in accordance with my procedure than in beer made by standard brewing procedures. The yield of yeast during the brewing procedure is increased as much as 50% or more in my improved brewing procedure as compared with former procedures. In general, the color of the beer is lighter and the flavor is much enhanced, being chosen above usual beer, by experienced brewmasters.

As a further illustration of the invention, but without limitation thereof, reference is made to the examples which follow.

*Example 1.*—Hot beer wort containing 12.24% extract, prepared from water, ⅔ malt and ⅓ adjuncts and hops was obtained from a commercial brewery. Using aseptic techniques throughout, the wort was divided into four equal parts. Two parts were used as a control, and to each of the other two parts de-fatted soybean flakes that had been boiled in distilled water for ½ hour were added at the rate of one part of soybean flakes, air dry basis, for each one thousand parts by weight of wort. The de-fatted soybean flakes before being added were placed in water in the proportion of about one part of flakes to 20 parts of distilled water and boiled for ½ hour, and the resultant slurry of distilled water and soybean flakes was added to the wort. The mixture of wort, and defatted soybean flakes, pasteurized as described, was then cooled and aerated and inoculated with 0.5% of a slurry of brewers' yeast, based upon the weight of the wort. The slurry of yeast contained 16.5% yeast solids, dry basis. That is to say, 0.5% by weight of slurry, based upon the wort was used, and such slurry contained 16.5% yeast solids, these figures being the usual yeast inoculation amounts. Fermentation was started at a temperature of 7° C., and after 16 hours of fermentation the temperature was raised to 10° C. and held there until the 9th day. The temperature was then gradually reduced to 2° C. after the 11th day. The progress of the fermentation (rate of fermentation) was followed daily by determining the weight of carbon dioxide released from the fermenting beer. All four runs were made at the same time and under the same conditions. In beer fermentation, the fermentable sugar is converted by the yeast enzymes into almost equal weights of carbon dioxide and alcohol and the determination of the carbon dioxide evolved on a time scale basis, is therefore a convenient means of determination of the progress of fermentation. Figure 1, to which attention is directed, presents graphically the results in terms of carbon dioxide released, and accordingly may also be taken as an indication of the rate of alcohol formation in the beer. In Figure 1, curve A (two parallel runs), shows the rate of carbon dioxide formation (and hence, the progress of fermentation) according to my invention. In these fermentations, soybean flakes had been added to the wort, and the fermentations proceeded rapidly and began to level off after about the middle of the 6th day. Curve B (two parallel control runs) shows, for comparison, the control (or usual fermentation of brewery wort), the fermentation did not begin to level off until about the tenth day. The two control runs were sampled and the samples composited and analyzed. Likewise, the two parallel test runs were sampled and the samples composited and analyzed. The analyses results were as follows:

|  | Control—Normal Wort, No Soya Flakes | Test—Normal Wort With 1 Part Soya Flakes Added For Each 1,000 Parts Wort |
|---|---|---|
| Alcohol by weight | 3.31% | 3.71%. |
| Apparent extract | 4.13% | 3.04%. |
| Real extract | 5.60% | 4.85%. |
| Yeast yield | 6.4 volumes | 9.1 volumes. |

All determinations except the yeast volume were made in accordance with the official methods described in "Methods of Analysis of the American Society of Brewing Chemists," 1949 edition. The yeast volume was determined by volumetric method measurements on washed wet yeast calculated to a 16.5% solid basis. It will be observed that as shown in Figure 1, the rate of fermentation according to my procedure (curve A) reached almost complete fermentation after approximately 6½ days, whereas the simultaneous control fermentation of normal wort (curve B) did not become completed until the 10th to the 11th day. Therefore, it may be concluded that approximately 3 to 4 days may be saved as compared with the normal brewing procedure. Likewise, as shown in the analyses above, by my process the alcohol content by weight was 3.71% as compared with 3.31% using the normal wort, and at the same time the solids content of the wort, as indicated by the "apparent extract" and "real extract" figures, was greatly reduced according to my method, the yield of yeast being meanwhile increased approximately 50% as compared with the yield using the normal wort.

*Example 2.*—A cold beer wort containing 12.1% extract was used. It was prepared with water using ⅔ malt and ⅓ adjuncts plus hops. This cold beer wort was simply taken from a regular commercial run in a commercial brewery and was produced wholly in accordance with the above described normal American brewing procedures. Using aseptic techniques throughout, the wort thus obtained in a brewery was divided into four equal parts herein designated A, B, C, and D. Part A was used as a control, and to each of the other three parts, B, C, and D, there was added a slurry of the same brewery wort and containing soybean flakes. In this slurry, the soybean flakes were mixed with the commercial brewery wort in the proportions of approximately one part of air-dry defatted soybean flakes, by weight, to 20 parts by weight of the wort. The slurry was heated to 100° C. for ½ hour so as to become pasteurized, and was then added hot to the cold brewery wort according to the amounts shown in the following table:

| Parallel Runs | Amount of Soybean Flakes (in the form of slurry) Added to the Wort |
| --- | --- |
| A (Control) | None. |
| B | 0.46 parts by weight per 1,000 parts by weight of wort. |
| C | 0.92 parts by weight per 1,000 parts by weight of wort. |
| D | 1.85 parts by weight per 1,000 parts by weight of wort. |

Each of the parallel test runs was then inoculated with the same type of brewery yeast at the rate of 0.5% by weight liquid brewers' yeast slurry (16.5% solids). Fermentation was started at 7° C. and raised to 13° C. after 17 hours, and held at a temperature between 9 and 11° C. until the 7th day. The temperature was then gradually lowered to 3° C. after the 9th day. The conditions were identical for each of the four parallel runs A through D, and they were carried out simultaneously.

*Analytical data*

| Run | A | B | C | D |
| --- | --- | --- | --- | --- |
| Soybean Flakes added parts per 1,000 (by weight) | 0 | 0.46 | 0.92 | 1.85. |
| Alcohol by weight | 3.56% | 3.62% | 3.67% | 3.63%. |
| Apparent extract | 3.40% | 3.20% | 3.10% | 3.20%. |
| Real extract | 5.07% | 4.87% | 4.79% | 4.86%. |
| Color (degrees Lovibond) | 2.9° | 2.7° | 2.6° | 2.5°. |
| Flavor choice | last | third | second | first. |

All determinations indicated above, except that of flavor, were made according to the official methods described in "Methods of Analysis of the American Society of Brewing Chemists," 1949 edition. The beers were graded for flavor by an experienced brewmaster. From the foregoing, it will be apparent that, using the techniques of my invention, the alcohol content is increased, the color is lighter, and the flavor is improved.

*Example 3.*—In a commercial brewery, two beer worts were prepared, one of these beer worts was a usual run for production and prepared in the normal way from water, ⅔ malt and ⅓ adjuncts plus hops, and contained 12.1% extract. A second beer wort, identical with the first, was also prepared, except that in the mash tub there was added soybean flakes at the rate of 1.85 parts by weight of air dried soybean flakes for each 1000 parts of finished wort produced. There were accordingly available two beer worts, each produced in a commercial brewery, the first containing no soybean factors, and the second containing certain soybean factors, which were present as a result of the soybean flakes having been added in the mash tub along with the barley malt, adjuncts, etc.

The first wort (which contained no soybean factors) was divided into two parts. One of these parts was used as a control. To the other part there was added a slurry of de-fatted soybean flakes in distilled water, the slurry having been boiled for ½ hour so as to be pasteurized. The slurry was made up of distilled water (20 parts) and soybean flakes (1 part), by weight, and enough of the slurry was added so as to provide 1.85 parts of soybean flakes, by weight (air dry basis), for each 1000 parts of the wort. As a result of the foregoing, there were available three kinds of worts as follows:

| Kind of Wort | Characteristics |
| --- | --- |
| A | A normal beer wort containing no soybean factors. |
| B | A beer wort in which the soybean factors were present as a result of having been included in the mash tub during the preparation of the wort. |
| C | A usual beer wort to which the soya components were added after the preparation of the wort. |

An equal quantity of each of these worts, A, B, and C, was then used for the preparation of beer in accordance with the following procedure. All were inoculated with the customary percentage of brewers' yeast and fermented as described in Example 1. The process of the fermentation was followed as in Example 1 by determining the amount of carbon dioxide produced during the fermentation procedure, from time to time, for each wort. The results are indicated in Figure 2, wherein it will be noted that the usual wort, designated A, containing no soybean factors, fermented at a gradually rising rate and reached completion in the normal time of 10 to 11 days. The wort, designated B, in which the soybean components were included as a result of the soybean flakes having been added at the mash tub during the preparation of the mash, fermented at a slightly increased rate, and produced slightly more carbon dioxide (and alcohol), but in general the rate of fermentation was approximately the same as for the usual wort. The wort, designated C, in which the de-fatted soybean solids were added to the already produced wort, had a fermentation which proceeded at a much more rapid rate and reached completion and began to level off about the middle of the seventh day. This example illustrates how, by the use of my improved beer making procedure, the time required for primary beer fermentation may be substantially reduced, even by as much as ⅓ or more.

Where the terms "yeast" or "brewers' yeast" is used herein, there is intended the usual 16.5% solids brewers' yeast slurry which is known in the brewing trade as "liquid yeast," and the yeast percentages used are calculated accordingly. Where other yeast concentrations are used, appropriate variations are made in the percentages of yeast that are used.

In place of hops, some brewers use hop oil.

As many apparently widely different embodiments of this invention may be made without departing from the spirit and scope thereof, it is to be understood that I do not limit myself to the specific embodiments herein.

What I claim is:

1. An improved process of making beer which comprises adding to a brewers' barley-wort after it has been produced, from .01% to .2% of defatted soybean solids, adding to the mixture an amount of brewers' yeast equivalent to 0.1% to 1.25% of 16.5% yeast solids content brewers' liquid yeast, and fermenting the mixture at a temperature in the range of 0° C. to 20° C. until the fermentation is substantially completed.

2. The process of making beer which comprises adding to a wort prepared from water, malted barley and hops, a pasteurized slurry containing defatted soybean solids in an amount ranging from 0.01% to 0.2% based upon the wort, inoculating the resultant mixture of wort and slurry with an amount of brewers' yeast equivalent to from 0.1% to 1.25%, based upon the weight of the wort, of 16.5% yeast solids content brewers' liquid yeast, fermenting the resultant inoculated wort at a temperature in the range of 0° C. to 11° C. until the fermentation is substantially completed and thereafter aging the resultant beer at a temperature of about 0° C.

3. The process of brewing which comprises adding to a pasteurized wort prepared from malted barley and hops a pasteurized slurry of defatted soybean solids in the amount of .01% to .2% soybean solids by weight based upon the amount of wort, inoculating said mixture with brewers' yeast in an amount equivalent to from 0.1% to 1.25% by weight based upon the amount of wort, of 16.5% yeast solids brewers' liquid yeast, initiating the fermentation at a temperature in the range of 7 to 9° C., permitting the temperature of the fermenting wort-containing mixture to rise to not substantially exceeding 12° C., reducing the temperature of the fermenting wort as the fermentation reaches approximate completion.

4. The method for the primary fermentation of beer comprising adding to a pasteurized wort made from malted barley and hops, from .05% to .15% of pasteurized defatted soybean solids, inoculating the resultant wort with yeast in an amount equivalent to 0.1% to 1.25% of 16.5% yeast solids content liquid brewery yeast, initiating fermentation at a temperature in the range of approximately 7° to 9° C., continuing the fermentation while maintaining the temperature of the wort at a temperature not exceeding 15° C. and terminating such said primary fermentation and cooling the resultant wort as the fermentation approaches completion.

References Cited in the file of this patent

UNITED STATES PATENTS

| Number | Name | Date |
| --- | --- | --- |
| 1,593,191 | Meyer | July 20, 1926 |
| 1,673,273 | Wallerstein | June 12, 1928 |
| 2,471,474 | Alba et al. | May 21, 1949 |

OTHER REFERENCES

The Practical Brewer, by Edward H. Vogel, Jr., et al., page 60. (Published November 1946.)